(12) United States Patent
Pradini et al.

(10) Patent No.: US 10,237,880 B2
(45) Date of Patent: Mar. 19, 2019

(54) METHOD AND RADIO ACCESS POINT FOR HANDLING COMMUNICATION BETWEEN WIRELESS DEVICES

(71) Applicant: Telefonaktiebolaget LM Ericsson (publ), Stockholm (SE)

(72) Inventors: Aidilla Pradini, Kista (SE); Ather Gattami, Stockholm (SE); Gabor Fodor, Hässelby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 150 days.

(21) Appl. No.: 15/105,133

(22) PCT Filed: Jan. 31, 2014

(86) PCT No.: PCT/SE2014/050129
§ 371 (c)(1),
(2) Date: Jun. 16, 2016

(87) PCT Pub. No.: WO2015/099589
PCT Pub. Date: Jul. 2, 2015

(65) Prior Publication Data
US 2016/0323892 A1    Nov. 3, 2016

Related U.S. Application Data

(60) Provisional application No. 61/921,105, filed on Dec. 27, 2013.

(51) Int. Cl.
*H04L 1/00*    (2006.01)
*H04W 72/08*   (2009.01)
(Continued)

(52) U.S. Cl.
CPC ...... *H04W 72/082* (2013.01); *H04B 7/15557* (2013.01); *H04W 72/048* (2013.01);
(Continued)

(58) Field of Classification Search
None
See application file for complete search history.

(56) References Cited

U.S. PATENT DOCUMENTS

2010/0261469 A1* 10/2010 Ribeiro ............... H04W 99/00
455/423
2011/0110288 A1  5/2011 Manssour
(Continued)

OTHER PUBLICATIONS

Fodor, Gábor, et al., "Design Aspects of Network Assisted Device-to-Device Communications," IEEE Communications Magazine, vol. 50, Issue 3, Mar. 2012, IEEE, pp. 170-177.
(Continued)

*Primary Examiner* — Brian S Roberts
(74) *Attorney, Agent, or Firm* — Patent Portfolio Builders, PLLC

(57) ABSTRACT

Method and radio access point for handling a two-way communication between a first wireless device and a second wireless device which are both served by the radio access point. A set of candidate transmission modes are available for use in the two-way communication. The radio access point obtains a mode-specific quality metric related to a predicted Signal to Interference and Noise Ratio, SINR, for each one of the candidate transmission modes, and selects one of the candidate transmission modes based on the obtained mode-specific quality metrics. The radio access point is thus able to select the transmission mode that has the best mode-specific quality metric in the set. The selected transmission mode is then applied for the two-way communication. Thereby, the most favorable transmission mode may be selected and used to provide satisfactory or even optimal performance.

14 Claims, 8 Drawing Sheets

(51) Int. Cl.
| | |
|---|---|
| H04W 76/23 | (2018.01) |
| H04B 7/155 | (2006.01) |
| H04W 72/04 | (2009.01) |
| H04W 88/04 | (2009.01) |
| H04W 88/06 | (2009.01) |
| H04W 88/10 | (2009.01) |

(52) U.S. Cl.
CPC ..... *H04W 76/23* (2018.02); *H04L 2001/0097* (2013.01); *H04W 88/04* (2013.01); *H04W 88/06* (2013.01); *H04W 88/10* (2013.01)

(56) References Cited

U.S. PATENT DOCUMENTS

| | | | | |
|---|---|---|---|---|
| 2011/0136525 | A1 | 6/2011 | Fujii et al. | |
| 2013/0286862 | A1* | 10/2013 | Sartori | H04W 76/023 370/252 |
| 2013/0322276 | A1* | 12/2013 | Pelletier | H04W 72/085 370/252 |
| 2013/0322277 | A1* | 12/2013 | Vanganuru | H04W 24/08 370/252 |
| 2014/0112162 | A1* | 4/2014 | Tavildar | H04W 48/08 370/252 |

OTHER PUBLICATIONS

Louie, Raymond, H. Y., "Practical Physical Layer Network Coding for Two-Way Relay Channels: Performance Analysis and Comparison," IEEE Transactions on Wireless Communications, vol. 9, Issue 2, Feb. 2010, IEEE, pp. 764-777.

Doppler, Klaus, et al., "Mode selection for Device-to-Device Communication underlaying an LTE-Advanced Network," 2010 IEEE Wireless Communication and Networking Conference, Apr. 18-21, 2010, Sydney Australia, IEEE, 6 pages.

Fodor, Gábor, et al., "On Applying Network Coding in Network Assisted Device-to-Device Communications," Proceedings of the 20th European Wireless Conference, May 14-16, 2014, Barcelona, Spain, VDE, 6 pages.

Li, Lihua, et al., "Cooperative Transmission Schemes of Base station assisted D2D Communications in Cellular Networks," IEEE 802.16 Broadband Wireless Access Working Group, DeN 16-13-0165-00-Gcon, Nov. 5, 2013, IEEE, 9 pages.

Rodziewicz, Marcin, "Network Coding Aided Device-to-Device Communication," 18th European Wireless Conference, Apr. 18-20, 2012, Poznan, Poland, VDE VERLAG GMBH, 5 pages.

International Search Report and Written Opinion for International Patent Application No. PCT/SE2014/050129, dated Oct. 15, 2014, 17 pages.

* cited by examiner

Cellular mode:

D2D mode:

Physical layer network coding mode:

Network coding mode:

Network coding with combining mode:

Two-way communication between A and B with relay R:

Two-way communication between A and B without relay:

METHOD AND RADIO ACCESS POINT FOR HANDLING COMMUNICATION BETWEEN WIRELESS DEVICES

This application is a 35 U.S.C. § 371 national phase filing of International Application No. PCT/SE2014/050129, filed Jan. 31, 2014, which claims the benefit of U.S. Provisional Application No. 61/921,105, filed Dec. 27, 2013, the disclosures of which are incorporated herein by reference in their entireties.

TECHNICAL FIELD

The present disclosure relates generally to a method and a radio access point in a wireless network for handling communication between two wireless devices being served by the radio access point.

BACKGROUND

When two wireless devices communicate with each other in a wireless network in a traditional manner, each wireless device communicates radio signals with a serving base station of the wireless network by sending uplink radio signals to the base station as well as receiving downlink radio signals from the base station. This is the traditional way of communication in a wireless network also when the two wireless devices are located somewhat close to one another and being served by the same base station. Recently, techniques have been developed to enable such wireless devices in a wireless network to communicate radio signals with each other directly, as controlled by the wireless network and using frequency spectrum licensed to the wireless network, such that each wireless device receives and decodes the actual radio signals that are transmitted directly from the opposite, or "peer", wireless device. Bluetooth is another example of direct communication between wireless devices, although without control or involvement by any network.

Communication of radio signals may thus take place directly between the two wireless devices without the radio signals being communicated over the wireless network via one or more base stations. In that case, the serving base station allocates radio resources, e.g. defined by time and/or frequency, which the wireless devices are allowed to use in the direct communication. Such direct radio communication between two wireless devices is commonly referred to as "Device-to-Device, D2D, communication" which term will be used throughout this disclosure.

In the field of cellular radio technology, the term "wireless device" is usually used and it will be used in this disclosure to represent any wireless communication entity capable of radio communication with a wireless network including receiving and sending radio signals. Another common term in this field is "User Equipment, UE" which implies that the communication entity can be carried and operated by a human user, examples include mobile telephones, tablets and laptop computers. However, a wireless device in this context is not limited to operation by a human user. It could also be a machine-to-machine type of device operating automatically such as a sensor, counter or measuring entity which may be stationary.

Further, the term "radio access point" refers to a node that can communicate radio signals with wireless devices, which may be a base station belonging to a wireless or cellular network. In the context of such a network, a base station is sometimes also referred to as a radio node, network node, e-NodeB, eNB, NB, base transceiver station, etc. The radio access point discussed in this disclosure may also be another wireless device that in some respect acts in the manner of a base station towards one or more wireless devices. Thus, the term "radio access point" represents any node belonging to a wireless network and which is arranged to communicate radio signals with wireless devices. Throughout this disclosure, the terms "Base Station, BS" and "User Equipment, UE" could be used instead of radio access point and wireless device, respectively. For example, the term "BS" is often used in this disclosure instead of radio access point.

The above D2D communication may thus be employed whenever the two wireless devices, also referred to as "peer devices" or just "peers", are close enough to one another to be able to receive and decode radio signals transmitted from the opposite peer. Thereby, it may be possible to reduce transmit power in the area and also to reduce interference, as compared to what is required to enable a serving radio access point to communicate radio signals with the wireless devices in the traditional manner.

In a conventional radio communication between a radio access point and a wireless device, a radio signal transmitted by the wireless device may be successfully received and decoded by the radio access point, or vice versa, provided that the current radio conditions allow for sufficient quality of the received signals such that e.g. a received Signal to Interference and Noise Ratio (SINR) exceeds a minimum required threshold or similar. This means that the received signal should not be too weak and/or interfered too much by other radio transmissions in the neighborhood for satisfactory reception and decoding. For example, the wireless device may be situated close to a cell edge and relatively far from the radio access point, or in a spot with bad radio coverage, so that the radio signal fades considerably on its way to the radio access point. Furthermore, the wireless device may in that case need to transmit with increased power in order to provide a sufficiently strong signal at the receiving radio access point, which may cause interference to other nearby communications. Another possibility is to add extra bits which can be used to assist the decoding in the radio access point's receiver although they occupy precious radio resources such that overall data throughput is reduced. In this case it may be more efficient to communicate over a D2D link instead of via the radio access point. It is also possible to take advantage of a combination of cellular and D2D communication, e.g. using network coding (NWC) by the radio access point, where the receiving device can use signals transmitted from both the serving radio access point and the opposite device for decoding.

However, different ways of communication may be more or less favorable to use in different situations depending on the radio conditions and what radio resources are used. Therefore, there is a risk that a way of communication is used that is less efficient and favorable than another way of communication would be. A technical problem discussed in the present disclosure may be defined as a problem of how to select an appropriate way of communication, also referred to as transmission mode, for bidirectional, or two-way, local communications in wireless or cellular networks supporting both D2D and network coding technologies.

SUMMARY

It is an object of embodiments described herein to address at least some of the problems and issues outlined above. It is possible to achieve this object and others by using a method and a radio access point as defined in the attached independent claims.

According to one aspect, a method is performed by a radio access point in a wireless network for handling a two-way communication between a first wireless device and a second wireless device. The first and second wireless devices are both served by the radio access point and a set of candidate transmission modes are available for use in the two-way communication. In this method, the radio access point obtains a mode-specific quality metric related to a predicted Signal to Interference and Noise Ratio, SINR, for each transmission mode in the set of candidate transmission modes. The radio access point further selects a transmission mode from the set of candidate transmission modes based on the mode-specific quality metrics obtained for the candidate transmission modes, and applies the selected transmission mode for the two-way communication between the first and second wireless devices.

Thereby, the radio access point is enabled to select and apply a transmission mode that provides a favorable SINR, or even the most favorable SINR of all the available candidate transmission modes, to achieve advantages such as efficient communication and utilization of resources, low power consumption, low interference, high quality and data throughput, good spectral efficiency, good signal reception, and so forth.

According to another aspect, a radio access point operable in a wireless network is arranged to handle a two-way communication between a first wireless device and a second wireless device. The first and second wireless devices can both be served by the radio access point, and a set of candidate transmission modes are available for use in the two-way communication. The radio access point is configured to obtain a mode-specific quality metric related to a predicted Signal to Interference and Noise Ratio, SINR, for each transmission mode in the set of candidate transmission modes. The radio access point is further configured to select a transmission mode from the set of candidate transmission modes based on the mode-specific quality metric obtained for the candidate transmission modes, and to apply the selected transmission mode for the two-way communication between the first and second wireless devices.

The above method and radio access point may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1A:
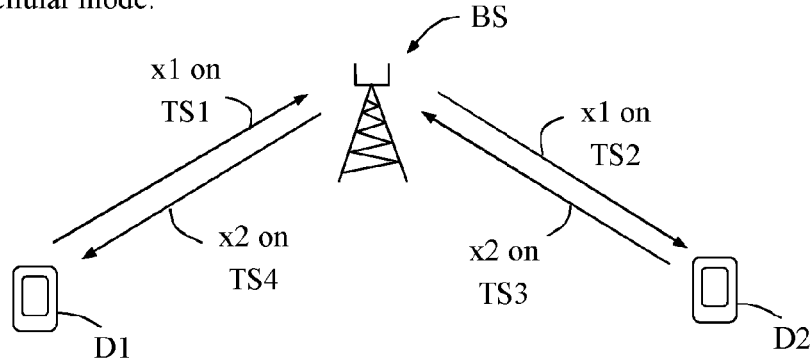
FIGS. 1a-e illustrate different possible transmission modes for a two-way communication between two wireless devices, which can be used in embodiments herein.

In this solution it has been realized that for a two-way communication between two wireless devices which are both served by one radio access point such as a base station, it is possible to overcome or at least reduce the above problems and drawbacks by evaluating different options of communication procedures or setups which are available for the two-way communication. In this disclosure, such options of communication procedures or setups are referred to as "transmission modes". Out of a set of different available candidate transmission modes, one transmission mode is selected that is likely to provide the most favorable conditions or results in terms of good signal reception, low power consumption and low interference.

This evaluation of candidate transmission modes is made by obtaining a mode-specific quality metric related to a predicted Signal to Interference and Noise Ratio, SINR, for each transmission mode which quality metrics are compared in order to select the transmission mode that has the "best", or at least a satisfying, quality metric out of the candidate transmission modes in the set. The mode-specific quality metric is valid for the complete end-to-end communication path between the two communicating devices, thus being related to an end-to-end SINR regardless of how many "hops" the path contains. The mode-specific quality metric may be the SINR itself or some parameter dependent thereof such as Bit Error Rate BER. In this context, it may be assumed that the best end-to-end SINR is able to provide the best link budget in terms of low transmission power and satisfactory signal reception since an increased SINR may provide better signal reception and/or enable reduced transmission power.

The embodiments described herein may be used to address the problem of how a radio access point should select transmission mode and allocate radio resources, e.g. time slots or physical resource blocks, when two wireless devices within its coverage area want to engage in a two-way information exchange, provided that D2D, network coding, and physical layer network coding technologies are available in the network. In practice, it is thus a problem how to choose the "best", or at least an adequate, transmission mode that may maximize an objective function either for a given wireless device pair or the network as a whole. The objective function could be signal-to-interference-plus-noise ratio (SINR), spectrum efficiency, energy consumption, or bit error rate (BER), among others. In this disclosure, the objective function can be referred to as a "quality metric" that may be determined for a set of candidate transmission modes in order to evaluate the candidate transmission modes for selection in a two-way communication between two wireless devices. In this way, the respective quality metrics are mode-specific and they are also related to a predicted Signal to Interference and Noise Ratio, SINR.

As indicated above, there are sometimes several options of transmission modes available when two wireless devices are served by the same radio access point including cellular communication where all signals are communicated over the radio access point, and D2D communication where all signals are communicated directly between the wireless devices without being relayed over the radio access point. Also, certain variants and combinations of the cellular and D2D procedures may also be possible and different transmission modes may further require different amounts of radio resources in terms of time intervals on a particular frequency carrier, here referred to as timeslots. In this disclosure, five such transmission modes will be discussed although the solution is not generally limited to these five transmission modes. For example, the solution may be applied for a subset of the five transmission modes described herein.

D2D and network coding have been intensively studied to improve cell capacity. For all of the above transmission modes, a so called end-to-end SINR (rather than traditional per-link SINR) metric can be calculated. End-to-end SINR is the SINR at the receiving UE associated to the transmission from the transmitting UE. The end-to-end SINR is often a more useful metric characterizing the bidirectional communication than a set of individual per-link SINR metrics.

The five transmission modes are schematically illustrated in FIGS. 1a-1e which will be briefly explained below. In these examples the radio access point is illustrated as a base station BS although it could also be some other communication entity capable of receiving uplink signals and transmitting downlink signals in the manner of a base station. For example, another wireless device may basically act as a radio access point when this solution is used and the solution is not limited in this respect. Throughout this disclosure, a two-way communication is assumed to take place where data "x1" is sent from a first wireless device D1 to a second wireless device D2 and data "x2" is sent from the second wireless device D2 to the first wireless device D1. Thus, data is assumed to be communicated in both directions.

FIG. 1a illustrates the conventional cellular mode where the first wireless device D1 and the second wireless device D2 communicate only via the radio access point BS over respective cellular radio links. In more detail, the first wireless device D1 sends data x1 on the uplink to the radio access point BS on a first timeslot TS1 and the radio access point BS sends the data x1 on the downlink to the second wireless device D2 on a second timeslot TS2. In the opposite direction, the second wireless device D2 sends data x2 on the uplink to the radio access point BS on a third timeslot TS3 and the radio access point BS sends the data x2 on the downlink to the first wireless device D1 on a fourth timeslot TS4. Hence, four timeslots are required for the two-way communication in the cellular mode.

Figure 1B:
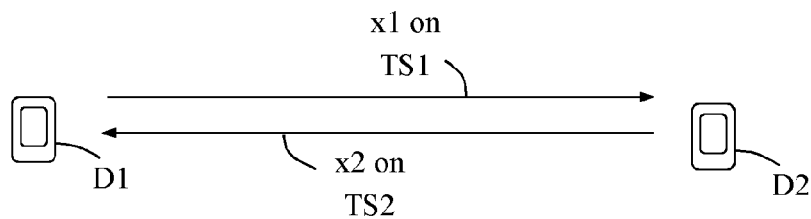

FIG. 1b illustrates the D2D mode where the first wireless device D1 and the second wireless device D2 communicate only directly over a D2D radio link between the first and second wireless devices D1, D2. The devices may use uplink radio resources for sending their data. In more detail, the first wireless device D1 sends data x1 on the D2D link to the second wireless device D2 on a first timeslot TS1. In the opposite direction, the second wireless device D2 sends data x2 on the D2D link to the first wireless device D1 on a second timeslot TS2. Hence, only two timeslots are required for the two-way communication in the D2D mode.

Figure 1C:
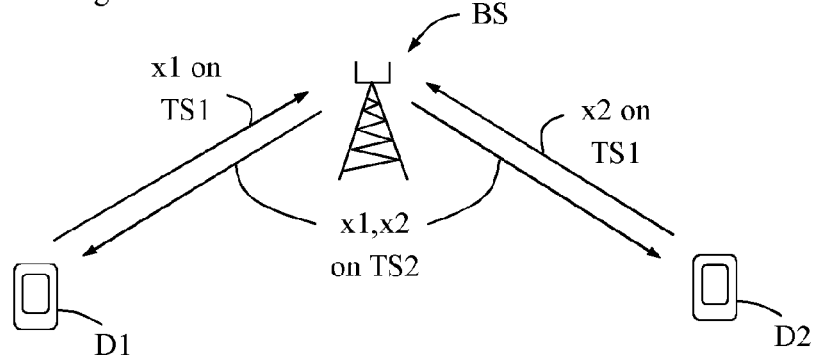

FIG. 1c illustrates a so-called "physical layer network coding mode" where the radio access point amplifies and transmits a superposition of signals x1, x2 which are simultaneously transmitted by the first wireless device D1 and the second wireless device D2, respectively. In more detail, the first wireless device D1 sends data x1 on the uplink to the radio access point BS on a first timeslot TS1 and in the opposite direction, the second wireless device D2 sends data x2 on the uplink to the radio access point BS simultaneously, i.e. on the same timeslot TS1. The radio access point BS then sends a combined, or aggregated, signal, being a superposition of the signals x1, x2, to both the first and second wireless devices D1, D2 on a second timeslot TS2. In other words, The radio access point BS receives an electromagnetic wave, which is a combined signal comprising a superposition of the simultaneously transmitted signals from two wireless devices, and then amplifies and forwards the combined signal to both devices. Hence, only two timeslots are required for the two-way communication in the physical layer network coding mode as well. By knowing its own transmitted data x1/x2, each wireless device is able to extract the unknown data x2/x1 sent from the opposite device from the received superposition of signals x1, x2.

Figure 1D:
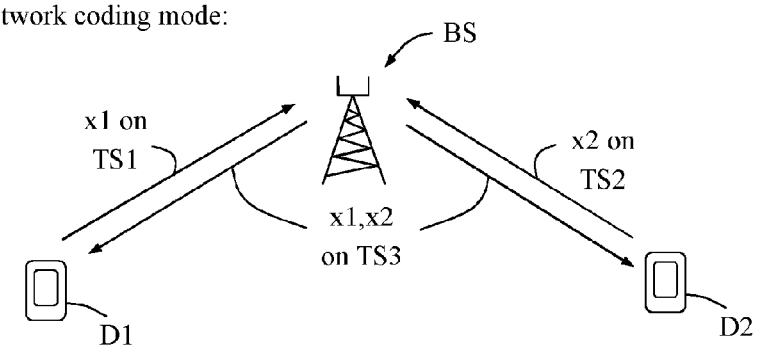

FIG. 1d illustrates a so-called "network coding mode" where the first wireless device D1 and the second wireless device D2 communicate via the radio access point BS over respective cellular radio links and the radio access point performs network coding of first data x1 transmitted from the first wireless device D1 and of second data x2 transmitted from the second wireless device D2. In more detail, the first wireless device D1 sends data x1 on the uplink to the radio access point BS on a first timeslot TS1 and in the opposite direction, the second wireless device D2 sends data x2 on the uplink to the radio access point BS on another timeslot TS2. The radio access point BS then performs network coding of the two signals x1, x2 and sends a network coded form of the signals x1, x2 to both the first and second wireless devices D1, D2 on a third timeslot TS3. Hence, three timeslots are required for the two-way communication in the network coding mode. By knowing its own transmitted data x1/x2, each wireless device is able to extract the unknown data x2/x1 sent from the opposite device from the received network coded form of signals x1, x2.

Figure 1E:
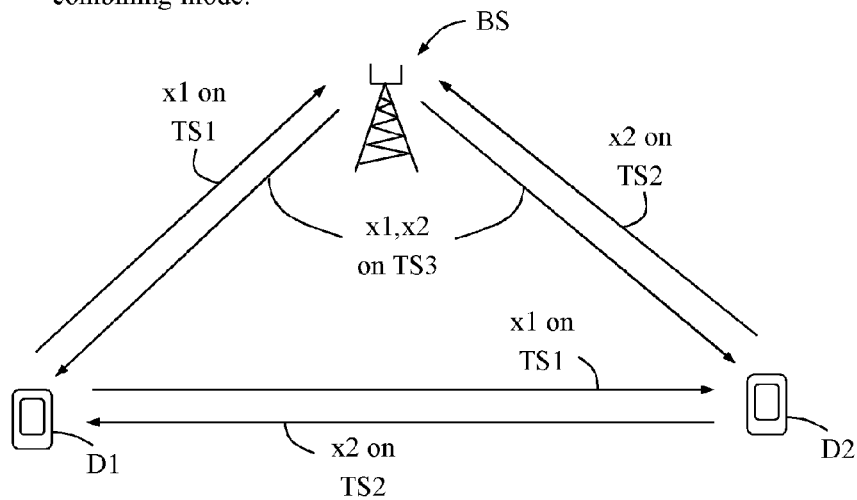

Finally, FIG. 1e illustrates a so-called "network coding with combining mode" where the first wireless device D1 and the second wireless device D2 communicate over the D2D radio link assisted by network coding by the radio access point BS of first data x1 transmitted from the first wireless device D1 and of second data x2 transmitted from the second wireless device D2. In more detail, the first wireless device D1 sends data x1 on the uplink to the radio access point BS and also directly to the second wireless device D2 on a first timeslot TS1. In the opposite direction, the second wireless device D2 sends data x2 on the uplink to the radio access point BS and also directly to the first wireless device D1 on another timeslot TS2. The radio access point BS then performs network coding of the two signals x1, x2 and sends a network coded form of the signals x1, x2 to both the first and second wireless devices D1, D2 on a third timeslot TS3. Hence, three timeslots are required for the two-way communication in the network coding with combining mode.

In the network coding with combining mode, by knowing its own transmitted data x1 or x2, each wireless device is able to perform a combining operation on the directly received data x2 or x1 and on the received network coded form of the signals x1, x2, and to extract the unknown data x2 or x1 accordingly. The combining operation in this transmission mode may be a conventional operation known as such in the art which is therefore not necessary to describe here. The wireless device can cancel out its own data in the received downlink signal in order to obtain the data from the opposite wireless device. As a variation to this 3-TS scheme, D2D technology facilitates the use of direct links between the two wireless devices. This way, each wireless device receives the information twice, first through a direct transmission over the D2D link and then in the form of network-coded data sent by the radio access point in the downlink. In other words, there is a diversity of signals received by each wireless device. The wireless devices can then use an appropriate combining/selecting mechanism such as maximum ratio combining (MRC) technique to combine the signals received from the direct and relayed transmissions.

For all of the above transmission modes, an end-to-end SINR, as opposed to a traditional per-link SINR, can be calculated. End-to-end SINR is the SINR at the receiving wireless device associated to the transmission from the transmitting wireless device. The end-to-end SINR is often a more useful metric for characterizing the bidirectional communication than a set of individual per-link SINR metrics.

An example of a procedure with actions, performed by a radio access point in a wireless network, will now be described with reference to the flow chart in FIG. 2. This procedure thus illustrates how the radio access point may operate such that the benefits of improved spectral and energy efficiency, efficient resource allocation, lower transmit power and reduced interference may be achieved. The radio access point is thus arranged or configured for handling a two-way communication between a first wireless device and a second wireless device, wherein the first and second wireless devices are both served by the radio access point and wherein a set of candidate transmission modes are available for use in the two-way communication.

In a first action 200, the radio access point may receive a request for a two-way communication from either of the wireless devices. It may be assumed that it is the first device that issues the request in order to start a communication session with the other wireless device. When the radio access point discovers that both devices are being served by itself, the radio access point is basically triggered to execute the procedure of evaluating a number of available transmission modes and select one of them for the two-way communication as follows.

In a next action 202, the radio access point may identify a set of radio resources that are available for use in the requested two-way communication. The identified set of radio resources may be used when evaluating the set of candidate transmission modes before selection. In some possible embodiments, the set of candidate transmission modes may include at least two of the above-described five transmission modes illustrated in FIGS. 1*a*-1*e*. Since these transmission modes require two, three or four timeslots as explained above, it would be suitable that the set of radio resources identified in action 202 includes four timeslots to enable evaluation of all five transmission modes, if desired.

In a next action 204, the radio access point obtains a mode-specific quality metric related to a predicted Signal to Interference and Noise Ratio, SINR, for each transmission mode in the set of candidate transmission modes. Each mode-specific quality metric may be determined and/or calculated for the same radio resources which may be the set of radio resources identified in action 202 above, such that the mode-specific quality metrics can be easily compared with each other. In another possible embodiment, the predicted SINR may thus be determined for each candidate transmission mode on a given set of radio resources. In yet a possible embodiment, the given set of radio resources may in that case be identified among radio resources which are not used. When a transmission mode is selected according to this evaluation procedure, the same radio resources will thus be available for allocation to the communication thus achieving the predicted SINR also when used in the two-way communication.

The quality metric for each transmission mode should reflect the complete communication including all radio links involved. Thus in another possible embodiment, the predicted SINR of each candidate transmission mode may be an end-to-end SINR valid for a total communication path between the first wireless device and the second wireless device.

The quality metrics for the respective transmission modes may be obtained from measurements made by the devices and/or by the radio access point on various signals such as reference signals which are typically transmitted in wireless networks for the purpose of link quality measurements from which e.g. the SINR can be calculated or derived. One or both of the wireless devices may also perform D2D link measurements on a beacon signal transmitted from the opposite device. In another possible embodiment, the radio access point may thus obtain the mode-specific quality metric based on a D2D radio link quality report received from at least one of the first wireless device and the second wireless device. In yet a possible embodiment, the radio access point may obtain the mode-specific quality metric based on measurements of the respective cellular radio links between the radio access point and the first and second wireless devices. The latter measurements of cellular radio link(s) may be performed by the radio access point and/or by the respective device.

In a next action 206, the radio access point selects a transmission mode from the set of candidate transmission modes based on the mode-specific quality metrics obtained for the candidate transmission modes. For example, the radio access point may select the transmission mode that has the "best", or at least an acceptable, mode-specific quality metric. The solution is thus not limited to only selecting the very best transmission mode in this respect but another, e.g. "next best", transmission mode may be deemed more favorable for selection than the best one when considering other factors apart from the mode-specific quality metrics, e.g. considering any interference that the two-way communication may create in relation to where one or more other wireless devices are located, or considering availability of radio resources.

In some further possible embodiments, the radio access point may select the transmission mode according to at least one of:
  select the transmission mode that has the highest predicted end-to-end SINR,
  select the transmission mode that has the highest predicted spectral efficiency, and
  select the transmission mode that has the lowest predicted Bit Error Rate BER.

In a next action 208, the radio access point applies the selected transmission mode for the two-way communication between the first and second wireless devices, which may comprise allocating radio resources to the wireless devices according to the selected transmission mode. In another possible embodiment, applying the selected transmission mode may further comprise signaling the selected transmission mode to the first wireless device and to the second wireless device.

Figure 2:
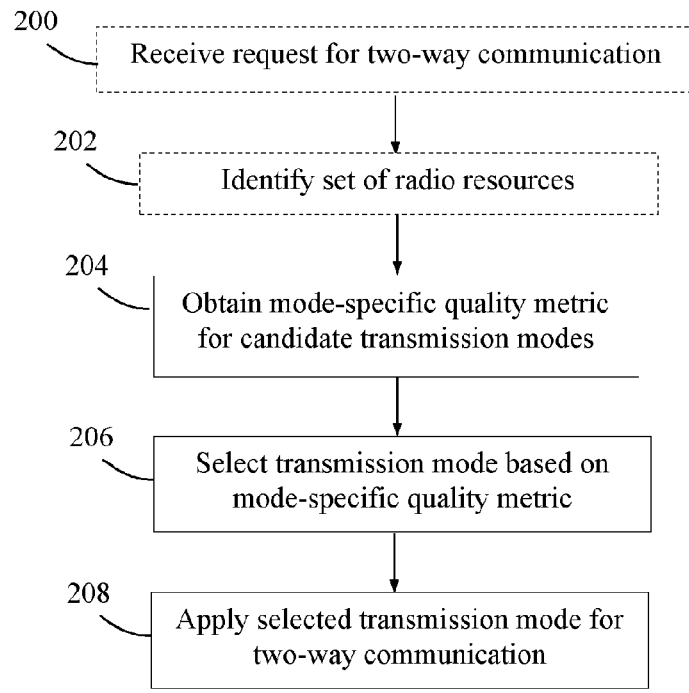
FIG. 2 is a flow chart illustrating a procedure in a radio access point, according to some possible embodiments.
Figure 3:
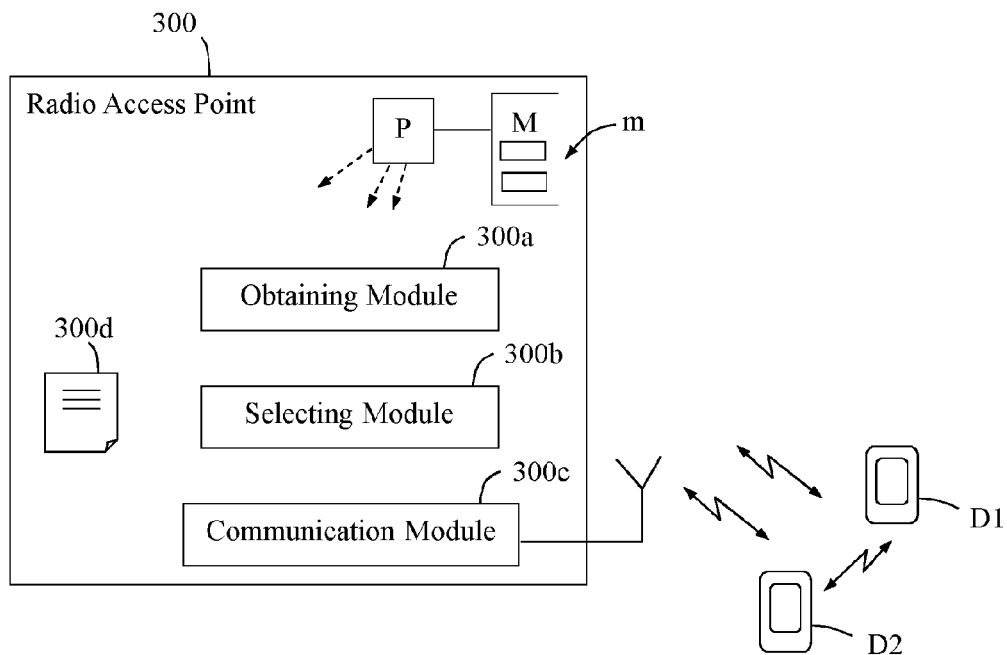
FIG. 3 is a block diagram illustrating a radio access point in more detail, according to further possible embodiments.

A detailed but non-limiting example of how a radio access point, being operable in a wireless network, may be structured to bring about the above-described functionality of the radio access point, is illustrated by the block diagram in FIG. 3. In this figure, the radio access point 300 is arranged to handle a two-way communication between a first wireless device D1 and a second wireless device D2, wherein the first and second wireless devices D1, D2 can both be served by the radio access point and wherein a set of candidate transmission modes 300d are available for use in the two-way communication, e.g. two or more of the transmission modes shown in FIGS. 1a-e. The radio access point 300 may be configured to operate according to any of the examples and embodiments of employing the solution as described above and as follows. In particular, the radio access point 300 may be configured or arranged to perform at least the actions 204-208 of the flow chart in FIG. 2 in the manner described above. These actions may be performed by means of different modules in the radio access point 300 as follows.

The radio access point 300 may comprise an obtaining module 300a which is configured to obtain a mode-specific quality metric related to a predicted Signal to Interference and Noise Ratio, SINR, for each transmission mode in the set of candidate transmission modes.

The radio access point 300 may also comprise a selecting module 300b which is configured to select a transmission mode from the set of candidate transmission modes 300d based on the mode-specific quality metric obtained for the candidate transmission modes.

The radio access point 300 may also comprise a communication module 300c which is configured to apply the selected transmission mode for the two-way communication between the first and second wireless devices.

It should be noted that FIG. 3 illustrates some possible functional modules 300a-c in the radio access point 300 and the skilled person is able to implement these functional modules in practice using suitable software and hardware. Thus, the solution is generally not limited to the shown structures of the radio access point 300, and the functional modules 300a-c may be configured to operate according to any of the features described in this disclosure, where appropriate.

The embodiments and features described herein may be implemented in a computer program comprising computer readable code which, when run on a radio access point, causes the radio access point to perform the above actions e.g. as described for FIG. 2 and the appropriate functionality described for the radio access point 300 in FIG. 3. Further, the above-described embodiments may be implemented in a computer program product comprising a computer readable medium on which the above computer program is stored. The computer program product may be a compact disc or other carrier suitable for holding the computer program. Some examples of how the computer program and computer program product can be realized in practice are outlined below.

The functional modules 300a-c described above for FIG. 3 may be implemented in the radio access point 300 by means of program modules of a respective computer program comprising code means which, when run by a processor "P" causes the radio access point 300 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the radio access point 200 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the radio access point 300.

Some examples of how the above-described solution and embodiments may be implemented in practice will be discussed in the following text, where the term BS is frequently used below but it could just as well be exchanged for the term radio access point throughout. Also, the term UE is frequently used below but it could just as well be exchanged for the term wireless device throughout.

A possible result of embodiments described herein is to develop a mechanism for the BS to predict the end-to-end SINR that is specific to the candidate transmission modes and allocate radio resources when two wireless devices within its coverage area want to have a two-way communication session, given that the five transmission modes included in table 1 below are available in the network. In other words, the BS predicts the end-to-end SINR for the possible transmission modes and then selects the transmission mode that is "best" in terms of this predicted SINR or some function of the predicted SINR (such as predicted spectral efficiency). This basic idea is complemented by other technology components on order to make the embodiments described herein industrially applicable.

TABLE 1

Available transmission modes and their corresponding required radio resources in the form of timeslots TS in uplink UL and in downlink DL. The BS selects one of the 5 modes based on SINR prediction.

| Transmission Mode | Required UL Resources (time slots) | Required DL Resources (time slots) |
| --- | --- | --- |
| Cellular mode (4-TS) | 2 | 2 |
| Network coding (3-TS) | 2 | 1 |
| Network coding with MRC receivers (3-TS) | 2 | 1 |
| Physical layer network coding (2-TS) | 1 | 1 |
| D2D communication (2-TS) | 2 | 0 |

The resource allocation may be jointly carried out together with mode selection, by the BS selecting one of the possible five transmission modes for a given communicating UE pair.

For example, radio resources to be allocated may be picked in a random manner by the BS among resources that are least used. This allows a simple practical implementation in the BS while limiting the intra-cell interference to a certain degree.

The BS bases mode selection decision on an estimation and prediction of end-to-end SINR for all possible transmission modes. The BS may then select the transmission mode that either maximizes the predicted SINR or maximizes the predicted spectral efficiency which is also based on the predicted SINR. This idea can be extended to target different objective functions which can be derived from end-to-end predicted SINR, such as minimizing the bit error rate.

In this solution channel state measurements, and SINR prediction that is specific to the candidate transmission modes, may be utilized, including the interference channels, in order to obtain the useful inputs to the prediction of end-to-end SINR. This approach is expected to be feasible in future radio access networks when new reference signals for uplink measurement are available. However, if predicting the full channel knowledge is not feasible, the solution is still applicable as long as cellular UL and DL channels from the BS to the two UEs and direct channels between the UEs can be predicted.

Figure 4:
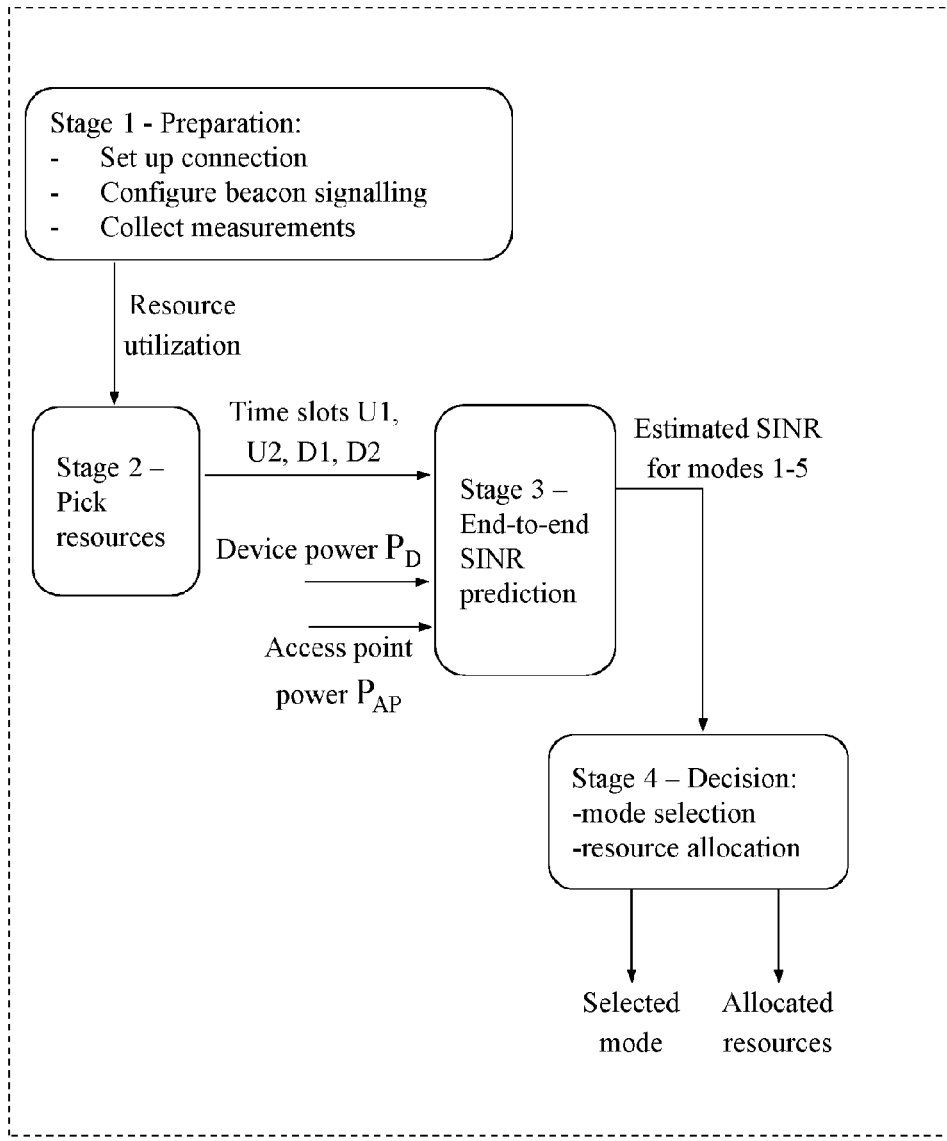
FIG. 4 is a schematic diagram illustrating an example of how a radio access point may operate, according to further possible embodiments.
Figure 5:
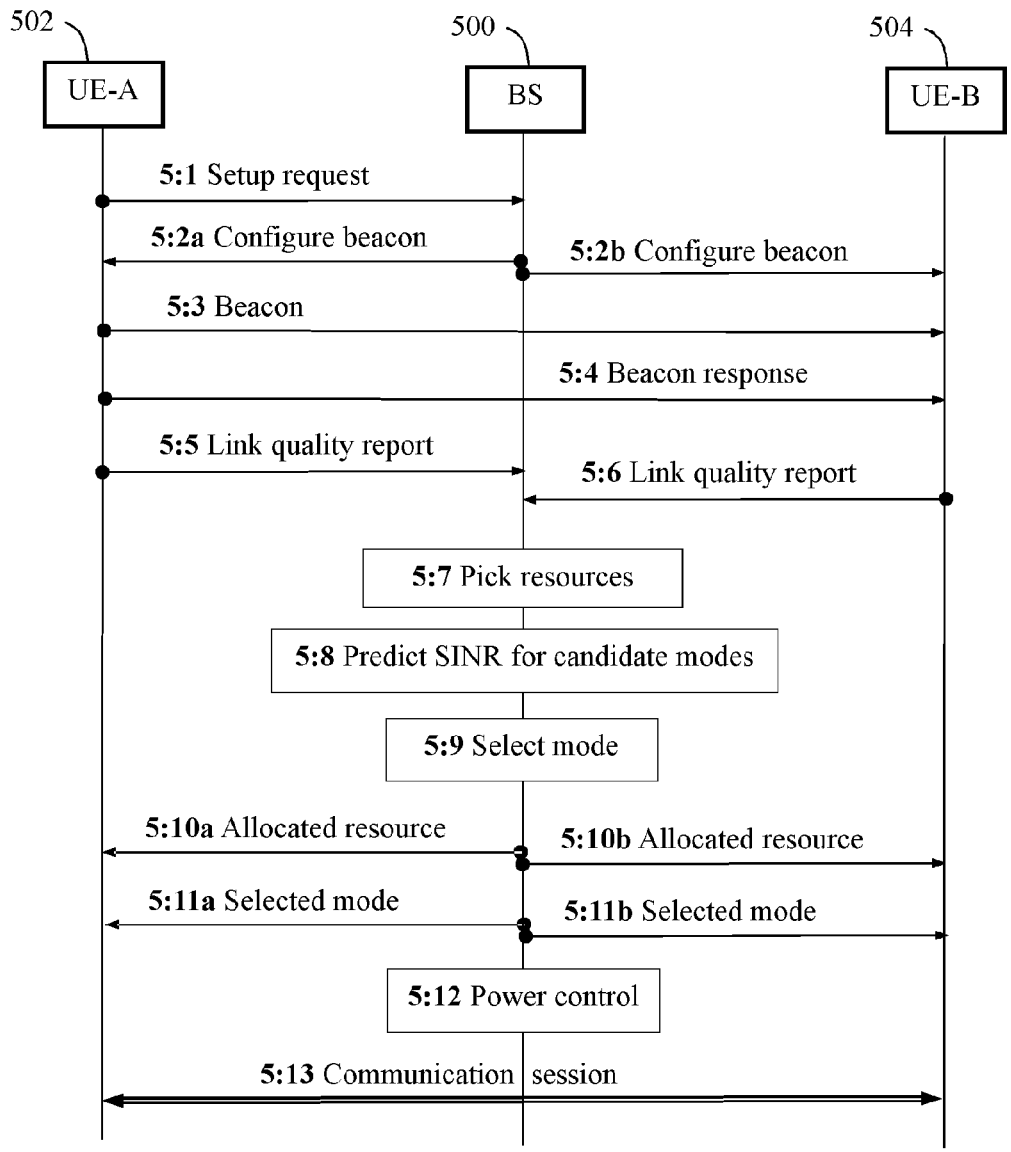
FIG. 5 is a signaling diagram illustrating an example of a procedure to set up a two-way communication between two wireless devices, according to further possible embodiments.

The procedure for mode selection and resource allocation may be divided into four stages which involve operation of the radio access point for every pair of locally communicating wireless devices referred to as UE-A and UE-B, as illustrated by FIG. 4 and by the signaling diagram in FIG. 5 involving the BS 500, UE-A 502 and UE-B 504. It is assumed that a set of candidate transmission modes is available as described above. Briefly described, the four stages are:

Stage 1: Preparation.
Stage 2: Pick radio resources, alternatively termed "Balanced random resource allocation".
Stage 3: End-to-end SINR Prediction.
Stage 4: Decision including mode selection and resource allocation.

FIG. 4 illustrates some input-output of information in these four stages in an operation or process performed by the radio access point, in this example a base station BS. Reference will also be made to the signaling and operation sequence of FIG. 5.

Stage 1: Preparation

To assist the resource allocation and mode selection decision by the BS based on SINR prediction, the UEs perform the following steps prior to the resource allocation decision by the BS:

Optionally, UE-A 502 sends a Set Up Request message to the BS 500, see action 5:1. In the Set Up Request message, UE-A may inform the BS about its own capabilities, including NW coding/decoding related capabilities. UE-A may also include information about the specific services it looks for or offers. In the Set Up Request message, UE-A may also indicate the specific UE-B with which it wants a D2D link to be set up.

The BS may have received similar Set Up Request messages, not shown, from potential peer UEs.

The BS 500 configures the beacon signaling messages that UE-A 502 and UE-B 504 should use during the network assisted peer discovery phase, see actions 5:2a and 5:2b, respectively. In these configuration messages, the BS may instruct the UEs 502, 504 what resources they should use and what information they should include in the beacons. For example, the BS 500 may inform or instruct the UEs which network coding functions they should support. A straightforward function is any linear combination of the broadcasted messages.

UE-A and UE-B use the configuration data as instructed by the BS when they broadcast their beacons, see actions 5:3 and 5:4, respectively. This allows e.g. UE-B to reply to UE-A, e.g. by a so-called page back signal or beacon response signal, if their network coding capabilities match. This could be helpful since it allows the BS to consider network coding as a valid option later in its resource allocation and mode selection decision.

Once UE-A and UE-B have detected each other, they send a link quality report to the BS, see actions 5:5 and 5:6, respectively. The link quality report is a key input to the mode selection decision. For example, UE-A and UE-B may also include information in their link quality reports to indicate whether they support a joint network coding function.

The BS also identifies the current utilization of radio resources which is needed for the next stage 2.

Stage 2: Balanced Random Resource Allocation

The resource allocation algorithm proposed in this disclosure may make use of resource utilization counters in conjunction with a simple random allocation. One possibility is to allocate the radio resources which are least used, avoiding the case of a high number of links sharing the same resource, hence the term "balanced". Having gone through the preparation stage 1, the BS has knowledge of which UL and DL resources are used by all UEs within its coverage area. Let us define UL and DL utilization vectors $\rho_U$ and $\rho_D$, denote $\rho_U(i)$ as the utilization counter of UL resource i, and denote $\rho_D(j)$ as the utilization counter of DL resource j. For each communicating UE pair, UE-A and UE-B in this case, the BS picks two UL resources and two DL resources in this case timeslots U1, U2, D1, and D2, respectively, which will be potential candidates for allocating resources for a two-way communication between UE-A and UE-B. As described above for FIGS. 1a-e, two UL resources and two DL resources are sufficient for evaluating all possible transmission modes accordingly and for using one of the modes in the two-way communication.

In an illustrative but non-limiting example, the BS may pick radio resources, indicated by action 5:7, by performing the following:

1. Pick the first UL resource, U1, by picking an UL resource a randomly out of the resources for which $\rho_U(i)=\min(\rho_U)$.
2. Increment $\rho_U(i)$, $\rho_U(i) \leftarrow \rho_U(i)+1$.
3. Pick the second UL resource, U2, by picking an UL resource randomly out of the resources for which $\rho_U(i)=\min(\rho_U)$.
4. Increment $\rho_U(i)$, $\rho_U(i) \leftarrow \rho_U(i)+1$.
5. Pick the first DL resource, D1, by picking a DL resource j randomly out of the resources for which $\rho_D(j)=\min(\rho_D)$.
6. Increment $\rho_D(j)$, $\rho_D(j) \leftarrow \rho_D(j)+1$.
7. Pick the second DL resource, D2, by picking a DL resources randomly out of the resources for which $\rho_D(j)=\min(\rho_D)$.
8. Increment $\rho_D(j)$, $\rho_D(j) \leftarrow \rho_D(j)+1$.

At the end of the balanced random allocation process of stage 2, four resources (U1, U2, D1, and D2) have been picked and the resource utilization counters have been updated.

Stage 3: End-to-End SINR Prediction

The BS is now able to make a prediction of end-to-end SINR for the possible transmission modes in the set of candidate transmission modes based on the channel knowledge, selected resources, and assumptions on BS and UE transmit power, also indicated by action 5:8.

At this prediction stage, all UEs are assumed to transmit with a constant power of P, in FIG. 4 denoted device power $P_D$, for all possible transmission modes because the resource allocation and mode selection take place before power control is performed. Similarly, the BS is also assumed to transmit with a constant power of P, in FIG. 4 denoted access point power $P_{AP}$, for all possible transmission modes. Thereby, the different transmission modes can easily be compared on equal terms in the evaluation for mode selection.

For the BS to be able to make an end-to-end SINR prediction for each specific transmission mode in the set of candidate transmission modes, it may employ a respective mathematical model and computation technique that is characteristic to the specific transmission mode, to be described in more detail later below.

Stage 4: Decision Making

In this stage, the BS decides which transmission mode to select from the set of candidate transmission modes based on the end-to-end SINR predictions obtained for the candidate transmission modes, also indicated by action 5:9. As mentioned above, this may be performed according to at least one of three different alternatives 1-3 which are presented below.

Alternative 1: SINR-Maximizing Mode Selection

The BS selects the transmission mode that has the highest predicted end-to-end SINR.

Alternative 2: Spectral Efficiency-Maximizing Mode Selection

The BS selects the mode that has the highest predicted spectral efficiency, $\hat{S}$. This prediction takes the end-to-end SINR prediction ($\hat{\gamma}_{mode}$) as well as the number of consumed resources ($\tau_{mode}$) into account.

$$\hat{S}_{mode} = \frac{\log_2(1 + \hat{\gamma}_{mode})}{\tau_{mode}}$$

$\tau_{mode}$=4 for cellular mode $\tau_{mode}$=3 for classical network coding and network coding with MRC modes $\tau_{mode}$=2 for physical layer network coding and D2D modes Alternative 3: Bit Error Rate-Minimizing Mode Selection The BS selects the mode that has the lowest predicted Bit Error Rate BER. The predicted bit error rate, $P_b$, is basically a function of the end-to-end SINR. This approach may be used by applying existing BER calculation techniques known in the art as such.

After selecting one of the five possible transmission modes as of action 5:9, the BS 500 assigns or allocates corresponding resources to the UE pair. Since the resource utilization counters have been incremented when picking U1, U2, D1, and D2 in action 5:7, they have to be decremented when any of the candidate resources is not used.

If 2-TS physical layer network coding mode is selected, resources U1 and D1 are assigned, while U2 and D2 are not used. The UL and DL resource utilization counters are decremented:

$\rho_U(U2) \leftarrow \rho_U(U2)-1$ $\rho_D(D2) \leftarrow \rho_D(D2)-1$

If 3-TS network coding mode is selected, with or without using MRC receivers, resources U1, U2, and D1 are assigned, while D2 is not used. The DL resource utilization counter is decremented:

$\rho_D(D2) \leftarrow \rho_D(D2)-1$

If 4-TS cellular mode is selected, all four resources are used, The resource utilization counters are not decremented.

FIG. 5 further illustrates that the BS 500 signals the allocated resources to UE-A and UE-B in actions 5:10a and 5:10b, respectively. The BS 500 also signals the selected transmission mode to UE-A and UE-B in actions 5:11a and 5:11b, respectively. Finally, the BS 500 performs power control according to regular procedures in action 5:12, and the two UEs 502, 504 can start the two-way communication, as indicated by action 5:13, according to the selected transmission mode.

An advantage of the embodiments described herein is that they may be used in a mechanism for the radio access point, e.g. a BS, to allocate resources and select transmission modes for a two-way communication between UEs such that the above-described benefits, e.g. in terms of spectral efficiency, low power and low interference, may be achieved. Such embodiments are thus possible to employ in a cellular network that supports network coding, physical layer network coding, and D2D communication. Existing solutions on resource allocation do not consider such a range of possible transmission modes. The embodiments described herein may thus improve spectral and energy efficiency of local communications in cellular networks.

Figure 6:
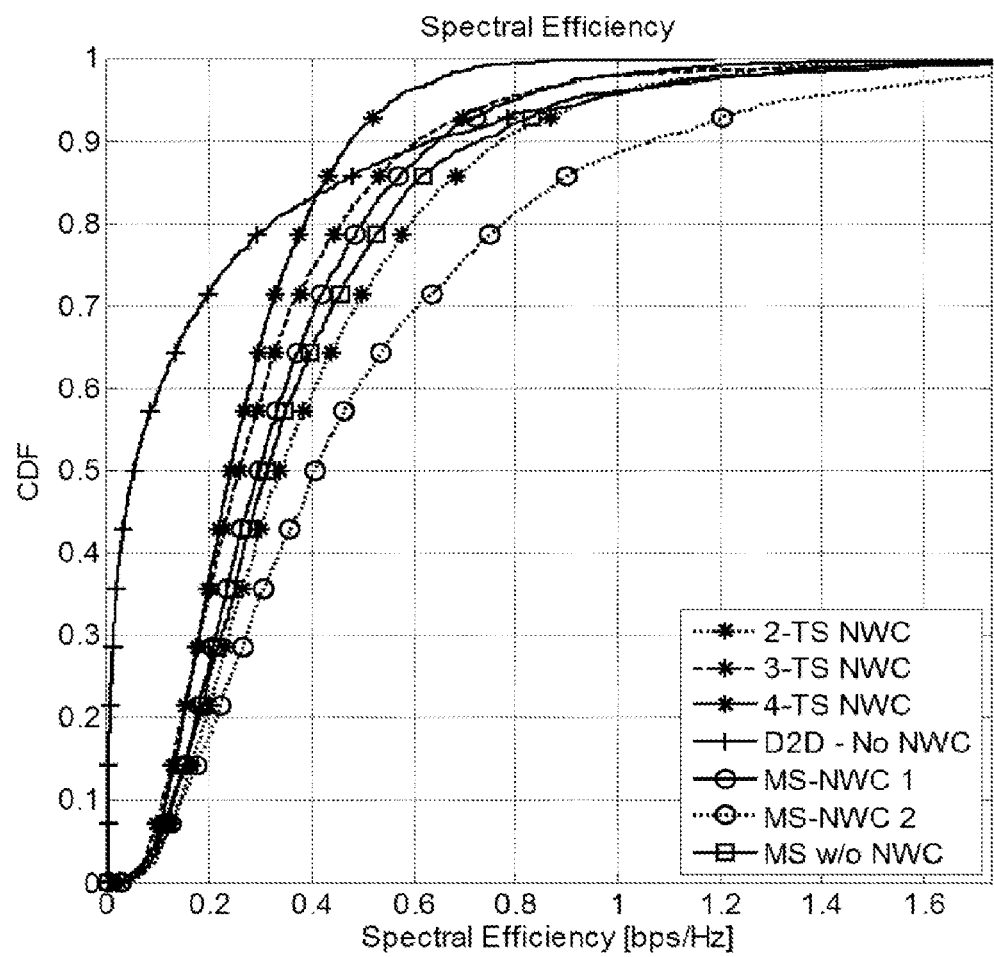
FIG. 6 is a measurement diagram illustrating the spectral efficiency that can be achieved with different transmission modes.

The diagram in FIG. 6 illustrates simulation results which show how the resource allocation/mode selection mechanism described herein, specifically with spectral-efficiency maximizing mode selection corresponding to the MS-NWC 2 curve and Alternative 2 above, is superior to other transmission schemes in terms of spectral efficiency. In this figure, CDF stands for Cumulative Distribution Function. With SINR-maximizing mode selection, see Alternative 1 above, the spectral efficiency is indicated by the MS-NWC 1 curve. MS w/o NWC represents a path-gain based mode selection in an integrated D2D-cellular network without NWC capabilities. Other curves shown in this figure represent scenarios without mode selection, i.e. all UEs are forced to operate in one of: D2D mode indicated by the D2D curve, 2-TS physical layer NWC mode indicated by the 2-TS NWC curve, 3-TS NWC with MRC receivers indicated by the 3-TS NWC curve, and cellular mode indicated by the 4-TS NWC curve.

Figure 7:
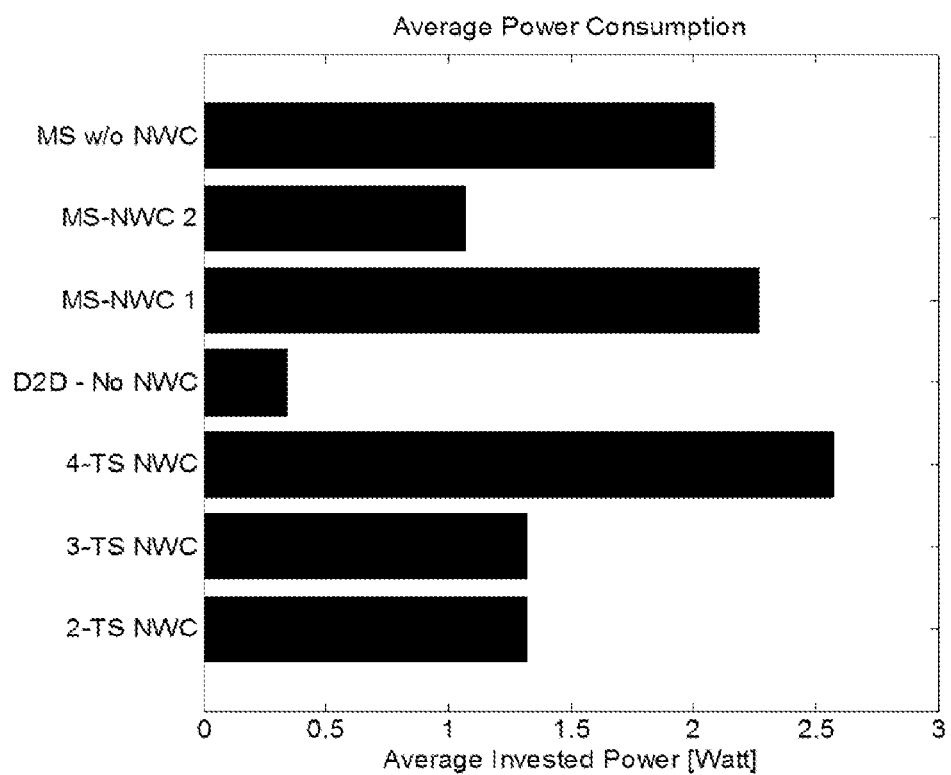
FIG. 7 is another measurement diagram illustrating the transmission power consumed when using different transmission modes.

The diagram in FIG. 7 illustrates further simulation results which show how the resource allocation/mode selection mechanism described herein, specifically with spectral-efficiency maximizing mode selection indicated by the MS-NWC 2 bar, is superior to other transmission schemes indicated by the forced 2-TS NWC, 3-TS NWC, 4-TS NWC bars, and mode selection strategies indicated by the MS-NWC 1 bar and the MS w/o NWC bar, in terms of average power consumption and invested transmit power. Forced D2D mode, although it may require the least transmit power, does not perform well in terms of spectral efficiency, see also FIG. 5.

Figure 8:
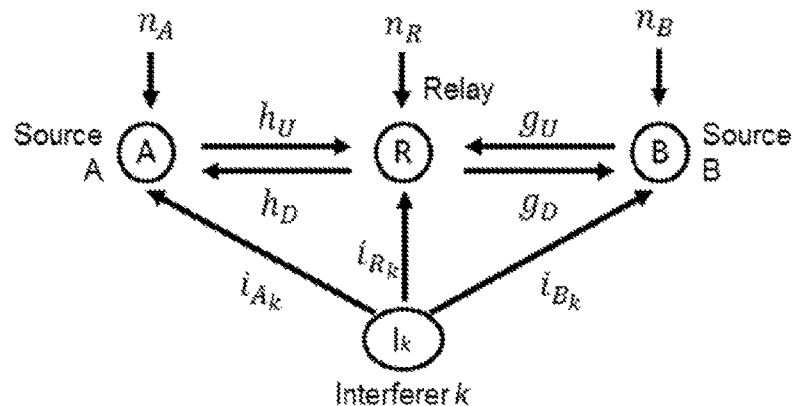
FIG. 8 illustrates different parameters for making a SINR prediction for a two-way communication between two wireless devices A and B when using a relay R.
Figure 9:
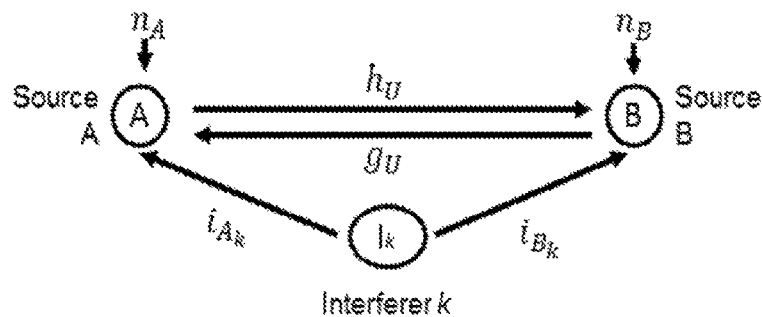
FIG. 9 illustrates different parameters for making a SINR prediction for a two-way communication between two wireless devices A and B without using a relay.

Some non-limiting examples will now be described of how the above discussed end-to-end SINR prediction may be performed when implementing the solution in practice for a two-way communication between two wireless devices A and B, with reference to FIGS. 8 and 9. However, it should be noted that other SINR prediction techniques could also be employed and the solution is not limited to the examples herein. A mathematical system model and computation technique for the case of using a relay, i.e. radio access point, is illustrated by FIG. 8 and the subsequent associated equations. Another mathematical system model and computation technique for the case of not using a relay, is illustrated by FIG. 9 and the subsequent associated equations. As an example, the end-to-end SINR expressions may be derived according to the system models shown in FIGS. 8 and 9, respectively.

FIGS. 8 and 9 thus illustrate system models for a two-way communication in which a source device A, also referred to as UE-A, intends to send a message $X_A$ to a source device B, also referred to as UE-B, and source device B would like to send a message $X_B$ to source device A. The model of FIG. 8 where a relay is used, may be applied for traditional cellular mode and all modes involving network coding. The model of FIG. 9 is applicable for the D2D mode. Both models take co-channel interference and additive Gaussian noise into consideration. In these models, the relay is a serving radio access point, also referred to as BS. The co-channel interferers are other wireless devices or UEs transmitting in the same UL time slot or other base stations transmitting in the same DL time slot.

Table 2 below lists all notations used in the system models and end-to-end SINR expressions described below.

TABLE 2

Notations in the system models and end-to-end SINR expressions

| Notation | Explanation |
|---|---|
| $h_U$, $h_D$ | UL and DL channels between UE-A and the serving BS. |
| $g_U$, $g_D$ | UL and DL channels between UE-B and the serving BS. |
| $I_k$ | Co-channel interferer (with index k). |
| $i_{Ak}$ | Channel between interferer $I_k$ and UE-A. It could be UL channel in D2D mode or DL channel otherwise. |
| $i_{Bk}$ | Channel between interferer $I_k$ and UE-B. It could be UL channel in D2D mode or DL channel otherwise. |
| $i_{Rk}$ | UL channel between interferer $I_k$ and the BS. |
| $n_A$, $n_R$, $n_B$ | Additive Gaussian noise at UE-A, relay (BS), and UE-B. |
| G | Relay gain. |
| $\sigma^2$ | Additive noise power. |
| P | Assumed constant UE power. |
| $P_{BS}$ | Assumed constant BS power. |
| U1, U2, D1, D2 | Candidate resources. |
| $(.)^{(U1)}$, $(.)^{(U2)}$, $(.)^{(D1)}$, $(.)^{(D2)}$ | Channels corresponding to resources U1, U2, D1, and D2. |
| $\alpha_A$, $\alpha_B$ | Power allocation numbers for 3-TS NWC mode; $\alpha_A^2 + \alpha_B^2 = 1$ |

End-to-End SINR Prediction for 2-TS Physical Layer Network Coding Mode
  Operation in 2-TS Physical Layer Network Coding Mode:
    In the first time slot, U1, both UE-A and UE-B transmit to the BS. The BS receives signal r which includes transmissions from UE-A and UE-B, interference, and noise.
    In the second time slot, D1, the BS amplifies the received signal r by relay gain G and forwards it to both UE-A and UE-B.
  Predicted End-to-End SINR at UE-A and UE-B and the Corresponding Relay Gain:

$$\hat{\gamma}_{A,2-TS} = \frac{G^2 P_{BS}|h_D|^2 P|g_U|^2}{G^2 P_{BS}|h_D|^2 \left(\sum_k P|i_{R_k}^{(U1)}|^2 + \sigma^2\right) + \sum_k P_{BS}|i_{A_k}^{(D1)}|^2 + \sigma^2}$$

$$\hat{\gamma}_{B,2-TS} = \frac{G^2 P_{BS}|g_D|^2 P|h_U|^2}{G^2 P_{BS}|g_D|^2 \left(\sum_k P|i_{R_k}^{(U1)}|^2 + \sigma^2\right) + \sum_k P_{BS}|i_{B_k}^{(D1)}|^2 + \sigma^2}$$

$$G = \sqrt{\frac{1}{P|h_U|^2 + P|g_U|^2 + \sigma^2}}$$

Predicted End-to-End SINR in 2-TS Physical Layer Network Coding Mode:

$$\hat{\gamma}_{2-TS} = \min(\hat{\gamma}_{A,2-TS}, \hat{\gamma}_{B,1-TS})$$

End-to-End SINR Prediction for 3-TS Network Coding Mode
  Operation in 3-TS Physical Layer Network Coding Mode:
    In the first time slot, U1, UE-A transmits to the BS. The BS receives signal $r_1$ which includes transmission from UE-A, interference, and noise.
    In the second time slot, U2, UE-B transmits to the BS. The BS receives signal $r_2$ which includes transmission from UE-B, interference, and noise.
    In the third time slot, D1, the BS transmits $\alpha_B r_1 + \alpha_A r_2$, amplified by relay gain G, and forwards it to both UE-A and UE-B. Power allocation numbers $\alpha_A$ and $\alpha_E$ are constrained by $\alpha_A^2 + \alpha_B^2 = 1$.
  Predicted End-to-End SINR at UE-A and UE-B and the Corresponding Relay Gain:

$$\hat{\gamma}_{A,3-TS} = \frac{G^2 P_{BS}|h_D|^2 \alpha_A^2 P|g_U|^2}{G^2 P_{BS}|h_D|^2 \varphi + \sum_k P_{BS}|i_{A_k}^{(D1)}|^2 + \sigma^2}$$

$$\hat{\gamma}_{B,3-TS} = \frac{G^2 P_{BS}|g_D|^2 \alpha_B^2 P|h_U|^2}{G^2 P_{BS}|g_D|^2 \varphi + \sum_k P_{BS}|i_{B_k}^{(D1)}|^2 + \sigma^2}$$

$$\varphi = \alpha_B^2 \left(\sum_k P|i_{R_k}^{(U1)}| + \sigma^2\right) + \alpha_A^2 \left(\sum_k P|i_{R_k}^{(U2)}| + \sigma^2\right)$$

$$G = \sqrt{\frac{1}{\alpha_B^2 P|h_U|^2 + \alpha_A^2 P|g_U|^2 + \sigma^2}}$$

Predicted End-to-End SINR in 2-TS Physical Layer Network Coding Mode:

$$\hat{\gamma}_{3-TS} = \min(\hat{\gamma}_{A,3-TS}, \hat{\gamma}_{B,3-TS})$$

End-to-End SINR Prediction for 3-TS Network Coding Mode with Maximum Ratio Combining Receivers
  Operation in 3-TS Physical Layer Network Coding Mode with MRC Receivers:
    In the first time slot, U1, UE-A transmits to the BS and to UE-B. The BS receives signal which includes transmission from UE-A, interference, and noise.
    In the second time slot, U2, UE-B transmits to the BS and to UE-A. The BS receives signal $r_2$ which includes transmission from UE-B, interference, and noise.
    In the third time slot, D1, the BS transmits $\alpha_B r_1 + \alpha_A r_2$, amplified by relay gain G, and forwards it to both UE-A and UE-B. Power allocation numbers $\alpha_A$ and $\alpha_B$ are constrained by $\alpha_A^2 + \alpha_B^2 = 1$.

3-TS network coding mode with MRC receivers requires both cellular links and direct links between UE-A and UE-B. Let $h_{U,direct}$ and $g_{U,direct}$ and denote direct channels from UE-A to UE-B and from UE-B to UE-A, respectively. Initially, the BS needs to calculate the predicted SINR in classical 3-TS network coding mode, to obtain $\hat{\gamma}_{A,3-TS}$ and $\hat{\gamma}_{B,3-TS}$. Predicted SINR when MRC receivers are employed is upper bounded by the sum of classical 3-TS mode SINR and D2D mode SINR.

$$\hat{\gamma}_{A,3-TS(+MRC)} \triangleq \hat{\gamma}_{A,3-TS} + \frac{P|g_{U,direct}|^2}{\left(\sum_k P|i_{A_k}^{(U2)}| + \sigma^2\right)}$$

$$\hat{\gamma}_{B,3-TS(+MRC)} \triangleq \hat{\gamma}_{B,3-TS} + \frac{P|h_{U,direct}|^2}{\left(\sum_k P|i_{B_k}^{(U1)}| + \sigma^2\right)}$$

$$\hat{\gamma}_{3-TS(+MRC)} = \min(\hat{\gamma}_{A,3-TS(+MRC)}, \hat{\gamma}_{B,3-TS(+MRC)})$$

End-to-End SINR Prediction for 4-TS Cellular Mode Operation in 3-TS Physical Layer Network Coding Mode with MRC Receivers:

In the first time slot, U1, UE-A transmits to the BS. The BS receives signal $r_1$ which includes the transmission from UE-A, interference, and noise.

In the second time slot, D1, the BS transmits $r_1$, amplified by gain $G_B$, to UE-B.

In the third time slot, U2, UE-B transmits to the BS. The BS receives signal $r_2$ which includes the transmission from UE-B, interference, and noise.

In the fourth time slot, D2, the BS transmits $r_2$, amplified by gain $G_A$, to UE-A.

Predicted End-to-End SINR at UE-A and UE-B and the Corresponding Relay Gain:

$$\hat{\gamma}_{A,4-TS} = \frac{G_A^2 P_{BS}|h_D|^2 P|g_U|^2}{G_A^2 P_{BS}|h_D|^2(\sum_k P|i_{R_k}^{(U2)}|^2 + \sigma^2) + \sum_k P_{BS}|i_{A_k}^{(D2)}|^2 + \sigma^2}$$

$$\hat{\gamma}_{B,4-TS} = \frac{G_B^2 P_{BS}|g_D|^2 P|h_U|^2}{G_B^2 P_{BS}|g_D|^2(\sum_k P|i_{R_k}^{(U1)}|^2 + \sigma^2) + \sum_k P_{BS}|i_{B_k}^{(D1)}|^2 + \sigma^2}$$

$$G_A = \sqrt{\frac{1}{P|g_U|^2 + \sigma^2}}, \quad G_B = \sqrt{\frac{1}{P|h_U|^2 + \sigma^2}}$$

Predicted End-to-End SINR in 4-TS Cellular Mode:

$$\hat{\gamma}_{4-TS} = \min(\hat{\gamma}_{A,4-TS}, \hat{\gamma}_{B,4-TS})$$

End-to-End SINR Prediction for D2D Mode
Operation in D2D Mode:

In the first time slot, U1, UE-A transmits to UE-B through direct link

In the second time slot, U2, UE-B transmits to UE-A through direct link $g_{U,direct}$.

Predicted End-to-End SINR at UE-A and UE-B:

$$\hat{\gamma}_{A,D2D} = \frac{P|g_U|^2}{\sum_k P|i_{A_k}^{(U2)}|^2 + \sigma^2}$$

$$\hat{\gamma}_{B,D2D} = \frac{P|h_U|^2}{\sum_k P|i_{B_k}^{(U1)}|^2 + \sigma^2}$$

Predicted End-to-End SINR in D2D:

$$\hat{\gamma}_{D2D} = \min(\hat{\gamma}_{A,D2D}, \hat{\gamma}_{B,D2D})$$

End-to-End SINR Prediction with Partial Channel State Information (CSI)

If full channel state information is not available, the SINR prediction can still work by setting all the interference terms ($\sum_k P|i_k|^2$) to zero. This would still require cellular UL and DL channels from the BS to the two UEs and direct channels between the UEs.

While the solution has been described with reference to specific exemplary embodiments, the description is generally only intended to illustrate the inventive concept and should not be taken as limiting the scope of the solution. For example, the terms "radio access point", "wireless device", "transmission mode", "mode-specific quality metric" and "network coding" have been used throughout this description, although any other corresponding entities, functions, and/or parameters could also be used having the features and characteristics described here.

Abbreviations
AWGN Additive White Gaussian Noise
BER Bit Error Rate
BS Base Station
SIC Successive Interference Cancellation
MRC Maximum Ratio Combining
NWC Network Coding
D2D Device-to-Device
SINR Signal-to-Interference-plus-Noise Ratio
TDD Time Division Duplex
TS Time Slot
UE User Equipment
UL Uplink
DL Downlink

The invention claimed is:

1. A method performed by a radio access point in a wireless network for handling a two-way communication between a first wireless device and a second wireless device, wherein the first and second wireless devices are both served by the radio access point and wherein a set of candidate transmission modes are available for use in the two-way communication, the method comprising:
    identifying, among a plurality of radio resources, a set of radio resources that are unused,
    obtaining a mode-specific quality metric related to a predicted Signal to Interference and Noise Ratio SINR for each transmission mode in the set of candidate transmission modes on the identified set of radio resources,
    selecting a transmission mode from the set of candidate transmission modes based on the mode-specific quality metrics obtained for the set of candidate transmission modes, and
    applying the selected transmission mode for the two-way communication between the first and second wireless devices.

2. The method according to claim 1, wherein the set of candidate transmission modes comprises at least two of:
    a cellular mode where the first wireless device and the second wireless device communicate via the radio access point over respective cellular radio links,
    a Device-to-Device D2D mode where the first wireless device and the second wireless device communicate directly over a D2D radio link between the first and second wireless devices,
    a network coding mode where the first wireless device and the second wireless device communicate via the radio access point over the respective cellular radio links and the radio access point performs network coding of first data transmitted from the first wireless device and of second data transmitted from the second wireless device,
    a network coding with combining mode where the first wireless device and the second wireless device communicate over the D2D radio link assisted by network coding by the radio access point of the first data transmitted from the first wireless device and of the second data transmitted from the second wireless device, and
    a physical layer network coding mode where the radio access point amplifies and transmits a superposition of signals simultaneously transmitted by the first wireless device and the second wireless device.

3. The method according to claim 1, wherein the predicted SINR of each transmission mode is an end-to-end SINR valid for a total communication path between the first wireless device and the second wireless device.

4. The method according to claim 1, wherein the radio access point selects the transmission mode according to at least one of:
- select the transmission mode that has the highest predicted end-to-end SINR,
- select the transmission mode that has the highest predicted spectral efficiency, and
- select the transmission mode that has the lowest predicted Bit Error Rate BERl.

5. The method according to claim 1, wherein applying the selected transmission mode comprises signalling the selected transmission mode to the first wireless device and to the second wireless device.

6. The method according to claim 1, wherein the radio access point obtains the mode-specific quality metric based on a Device-to-Device D2D radio link quality report received from at least one of the first wireless device and the second wireless device.

7. The method according to claim 1, wherein the radio access point obtains the mode-specific quality metrics, for the set of candidate transmission modes, based on measurements of respective cellular radio links between the radio access point and the first and second wireless devices.

8. A radio access point operable in a wireless network and arranged to handle a two-way communication between a first wireless device and a second wireless device, wherein the first and second wireless devices are both served by the radio access point, and wherein a set of candidate transmission modes are available for use in the two-way communication, the radio access point comprising a processor configured to:
- identify, among a plurality of radio resources, a set of radio resources that are unused, obtain a mode-specific quality metric related to a predicted Signal to Interference and Noise Ratio SINR for each transmission mode in the set of candidate transmission modes on the identified set of radio resources,
- select a transmission mode, from the set of candidate transmission modes, based on the mode-specific quality metrics obtained for the set of candidate transmission modes, and
- apply the selected transmission mode for the two-way communication between the first and second wireless devices.

9. The radio access point according to claim 8, wherein the set of candidate transmission modes comprises at least two of:
- a cellular mode where the first wireless device and the second wireless device communicate via the radio access point over respective cellular radio links,
- a Device-to-Device D2D mode where the first wireless device and the second wireless device communicate directly over a D2D radio link between the first and second wireless devices,
- a network coding mode where the first wireless device and the second wireless device communicate via the radio access point over the respective cellular radio links and the radio access point performs network coding of first data transmitted from the first wireless device and of second data transmitted from the second wireless device,
- a network coding with combining mode where the first wireless device and the second wireless device communicate over the D2D radio link assisted by network coding by the radio access point of the first data transmitted from the first wireless device and of the second data transmitted from the second wireless device, and
- a physical layer network coding mode where the radio access point amplifies and transmits a superposition of signals simultaneously transmitted by the first wireless device and the second wireless device.

10. The radio access point according to claim 8, wherein the predicted SINR of each transmission mode is an end-to-end SINR valid for a total communication path between the first wireless device and the second wireless device.

11. The radio access point according to claim 8, wherein the processor is configured to select the transmission mode according to at least one of:
- select the transmission mode that has the highest predicted end-to-end SINR,
- select the transmission mode that has the highest predicted spectral efficiency, and
- select the transmission mode that has the lowest predicted Bit Error Rate BER.

12. The radio access point according to claim 8, wherein the processor is configured to apply the selected transmission mode by signalling the selected transmission mode to the first wireless device and to the second wireless device.

13. The radio access point according to claim 8, wherein the processor is configured to obtain the mode-specific quality metric based on a Device-to-Device D2D radio link quality report received from at least one of the first wireless device and the second wireless device.

14. The radio access point according to claim 8, wherein the processor is configured to obtain the mode-specific quality metrics, for the set of candidate transmission modes, based on measurements of respective cellular radio links between the radio access point and the first and second wireless devices.

* * * * *